(12) United States Patent
Barnwell et al.

(10) Patent No.: US 10,186,720 B2
(45) Date of Patent: Jan. 22, 2019

(54) MEMBRANE-SEAL ASSEMBLY

(71) Applicant: JOHNSON MATTHEY FUEL CELLS LIMITED, London (GB)

(72) Inventors: David Edward Barnwell, Wiltshire (GB); Robert Jeffrey Coleman, Wiltshire (GB); Angus Dickinson, Wiltshire (GB); Peter Geoffrey Gray, Wiltshire (GB); Jorge Manuel Caramelo Soares, Wiltshire (GB)

(73) Assignee: Johnson Matthey Fuel Cells Limited, London, England (GB)

( * ) Notice: Subject to any disclaimer, the term of this patent is extended or adjusted under 35 U.S.C. 154(b) by 297 days.

(21) Appl. No.: 15/128,065

(22) PCT Filed: Mar. 24, 2015

(86) PCT No.: PCT/GB2015/050865
§ 371 (c)(1),
(2) Date: Sep. 21, 2016

(87) PCT Pub. No.: WO2015/145129
PCT Pub. Date: Oct. 1, 2015

(65) Prior Publication Data
US 2017/0110742 A1 Apr. 20, 2017

(30) Foreign Application Priority Data

Mar. 24, 2014 (GB) .................................. 1405209.6
Mar. 24, 2014 (GB) .................................. 1405211.2

(51) Int. Cl.
*H01M 8/0276* (2016.01)
*H01M 8/1007* (2016.01)
(Continued)

(52) U.S. Cl.
CPC ....... *H01M 8/0276* (2013.01); *H01M 4/8605* (2013.01); *H01M 4/92* (2013.01);
(Continued)

(58) Field of Classification Search
CPC . H01M 2008/1095; H01M 2300/0082; H01M 4/8605; H01M 4/92; H01M 8/0239;
(Continued)

(56) References Cited

U.S. PATENT DOCUMENTS

2007/0215461 A1 9/2007 Zuber et al.
2009/0165933 A1 7/2009 Losch et al.
(Continued)

FOREIGN PATENT DOCUMENTS

CN 101512085 A1 8/2009
CN 102934273 A 2/2013
(Continued)

OTHER PUBLICATIONS

International Search Report, dated May 8, 2015, from corresponding PCT Application.
(Continued)

*Primary Examiner* — Carlos Barcena
(74) *Attorney, Agent, or Firm* — Baker & Hostetler LLP

(57) ABSTRACT

Disclosed is a reinforced membrane-seal assembly, the reinforced membrane-seal assembly including: an inner region and a border region and wherein the inner region includes ion-conducting component and the border region includes seal component; wherein first and second planar porous reinforcing components each extend across the inner region into the border region and wherein the pores of each of the first and second planar porous reinforcing components in the inner region are impregnated with ion-conducting component and the pores of each of the first and second planar porous reinforcing components in the border region are
(Continued)

impregnated with seal component is disclosed. Also disclosed is a catalyst-coated reinforced membrane-seal assembly, a reinforced membrane-seal electrode assembly and an electrochemical device including the reinforced membrane-seal assembly.

12 Claims, 2 Drawing Sheets

(51) Int. Cl.
*H01M 8/1004* (2016.01)
*H01M 4/92* (2006.01)
*H01M 8/1041* (2016.01)
*H01M 8/1053* (2016.01)
*H01M 8/1058* (2016.01)
*H01M 4/86* (2006.01)
*H01M 8/0239* (2016.01)
*H01M 8/1018* (2016.01)

(52) U.S. Cl.
CPC ....... *H01M 8/0239* (2013.01); *H01M 8/1004* (2013.01); *H01M 8/1007* (2016.02); *H01M 8/1041* (2013.01); *H01M 8/1053* (2013.01); *H01M 8/1058* (2013.01); *H01M 2008/1095* (2013.01); *H01M 2300/0082* (2013.01)

(58) Field of Classification Search
CPC ............ H01M 8/0276; H01M 8/1004; H01M 8/1007; H01M 8/1041; H01M 8/1053; H01M 8/1058
See application file for complete search history.

(56) References Cited

U.S. PATENT DOCUMENTS

| | | | | |
|---|---|---|---|---|
| 2009/0246592 | A1* | 10/2009 | Kinoshita | H01M 8/0291 429/483 |
| 2010/0051181 | A1 | 3/2010 | Mori | |
| 2010/0062304 | A1 | 3/2010 | Okanishi et al. | |
| 2010/0173222 | A1* | 7/2010 | Suzuki | H01M 8/0271 429/483 |
| 2010/0291462 | A1 | 11/2010 | Thate et al. | |
| 2013/0202986 | A1 | 8/2013 | Moose et al. | |

FOREIGN PATENT DOCUMENTS

| | | |
|---|---|---|
| DE | 10 2011 106 767 B3 | 1/2012 |
| EP | 0 731 520 A1 | 7/1996 |
| EP | 0 731 520 A1 | 9/1996 |
| EP | 0 900 249 A1 | 3/1999 |
| EP | 1 676 332 A1 | 7/2006 |
| EP | 2 357 698 A1 | 8/2011 |
| EP | 2 514 010 A1 | 10/2012 |
| JP | 2011-65877 A | 3/2011 |
| WO | 97/41168 A1 | 11/1997 |
| WO | 2005/020356 A1 | 3/2005 |
| WO | 2007/110397 A1 | 10/2007 |
| WO | WO 2008/029243 A1 | 3/2008 |
| WO | 2009/040571 A1 | 4/2009 |
| WO | 2009/109780 A1 | 9/2009 |
| WO | 2011/073652 A1 | 6/2011 |
| WO | WO 2011/104542 A1 | 9/2011 |
| WO | 2012/017225 A1 | 2/2012 |

OTHER PUBLICATIONS

International Search Report, dated May 19, 2015, from corresponding co-pending PCT Application No. PCT/GB2015/050863.
United Kingdom Search Report, dated Sep. 15, 2014, from corresponding GB Application No. 1405209.6.
United Kingdom Search Report, dated Sep. 15, 2014, from corresponding GB Application No. 1405211.2.

* cited by examiner

MEMBRANE-SEAL ASSEMBLY

FIELD OF THE INVENTION

The present invention relates to a reinforced membrane-seal assembly and in particular to a reinforced membrane-seal assembly having multiple reinforcing layers. The reinforced membrane-seal assembly of the invention is suitable for use in a fuel cell or an electrolyser.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen-fuelled or alcohol-fuelled proton exchange membrane fuel cells (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalyst-coated ion-conducting membrane. Subsequently, gas diffusion layers are applied to both faces of the catalyst-coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Film layers, typically formed from non-ion conducting polymers, are generally positioned around the edge region of the MEA on the exposed surfaces of the ion-conducting membrane where no electrocatalyst is present to seal and/or reinforce the edge of the MEA. An adhesive layer may be present on one or both surfaces of the film layer.

The component layers in the MEA are typically bonded by a lamination process. Typically, much of the polymeric ion conducting material used in the membrane extends beyond the electrochemically active region into a non-electrochemically active region, often by up to several centimeters. In low geometric area MEAs this non-electrochemically active region can contribute to as much as 50% of the entire MEA geometric area. The membrane which extends beyond the electrochemically active area does not contribute to the activity and performance. The polymeric ion-conducting membrane is one of the most costly components in the fuel cell, and it is thus desirable to minimise its usage. Furthermore, the seal film layers positioned around the edge region of the MEA are typically formed by taking a roll of film and cutting out a central region to create a window frame which is then positioned around the edge of the MEA. Thus a significant proportion of the seal film material is also wasted. It is common practice that the polymeric ion-conducting membrane also comprises a reinforcement material, such as a planar porous material, embedded within the thickness of the membrane, to provide for improved mechanical strength of the membrane and thus increased durability of the MEA and lifetime of the fuel cell.

SUMMARY OF THE INVENTION

To enable a faster rate of commercialisation of fuel cells and a greater market penetration it is necessary to make further improvements in the performance and durability of the MEA and also to reduce the materials usage and thus costs, and also to significantly reduce manufacturing costs and increase the manufacturing output rate for the MEA. As such continuous high volume manufacturing processes wherein a continuous roll of MEA is produced at high speed are being introduced as alternatives to manufacturing processes where single, individual MEAs are assembled from the separate MEA components. MEA designs are therefore required which simultaneously (i) improve the functional performance characteristics of the MEA, (ii) maximise the utilisation of the expensive materials and components, and (iii) are also capable of being manufactured by low cost, high speed and throughput manufacturing processes.

The present invention provides a design for a reinforced membrane-seal assembly, which provides for enhanced strength, mechanical stability and thus durability, a high utilisation of the ion-conducting membrane and the seal film material, and which is amenable to a high speed continuous manufacturing process.

The present invention provides a reinforced membrane-seal assembly, the reinforced membrane seal assembly comprising an inner region and a border region and wherein the inner region comprises ion-conducting component and the border region comprises seal component;

wherein first and second planar reinforcing components each extend across the inner region into the border region and wherein the pores of each of the first and second planar reinforcing components in the inner region are impregnated with ion-conducting component and the pores of each of the first and second planar reinforcing components in the border region are impregnated with seal component.

Also provided is a process for making the reinforced membrane-seal assembly of the invention.

The invention further provides a catalyst-coated reinforced membrane seal assembly and a reinforced membrane-seal electrode assembly.

DETAILED DESCRIPTION OF THE INVENTION

The present invention provides a reinforced membrane-seal assembly, the reinforced membrane seal assembly comprising an inner region and a border region and wherein the inner region comprises ion-conducting component and the border region comprises seal component;

wherein first and second planar reinforcing components each extend across the inner region into the border region and wherein the pores of each of the first and second planar reinforcing components in the inner region are impregnated with ion-conducting component and the pores of each of the first and second planar reinforcing components in the border region are impregnated with seal component.

One or more additional planar reinforcing components may extend across the inner region into the border region of the reinforced membrane-seal assembly.

Inner and Border Region

The inner region refers to a planar area in the x/y direction (in-plane direction) and which extends through the thickness of the reinforced membrane-seal assembly in a though-plane direction (z-direction).

The border region refers to a planar area in the in-plane direction and which extends through the thickness of the reinforced membrane-seal assembly in a though-plane direction (z-direction), the border region extends around the periphery of the inner region.

Figure 1:
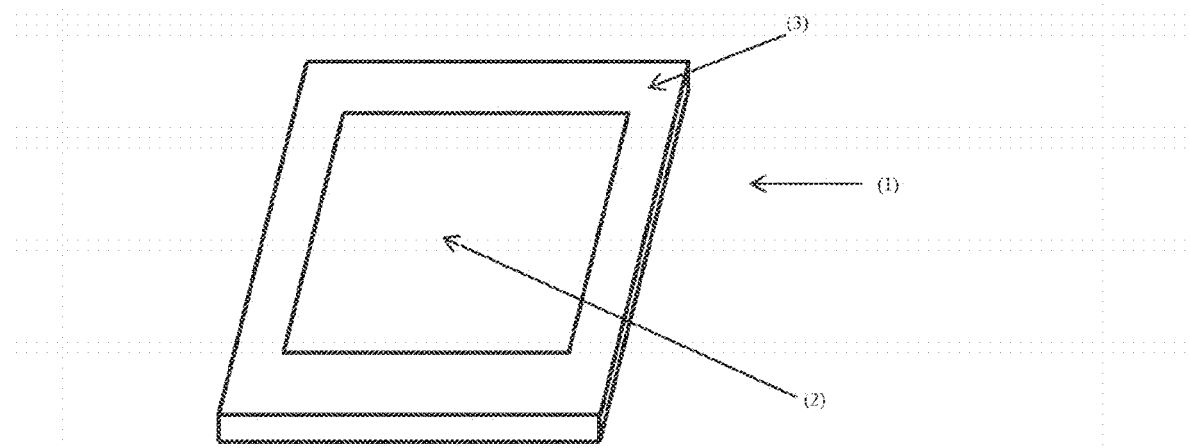
FIG. 1 shows the inner and border regions of a reinforced membrane-seal assembly of the invention.

A better understanding of the term 'inner region' and 'border region' is obtained from FIG. 1 which shows a reinforced membrane-seal assembly (1) having an inner region (2) and a border region (3).

Conventionally, the inner region has a quadrilateral geometry, such as a rectangle or square, and the border region creates a frame around the inner region. However, it will be understood that the inner region can be of any geometric shape; the inner edge of the border region will then have the same geometric shape as the inner region. The outer edge of the border region does not necessarily have to have a geometric shape corresponding to the shape of the inner edge; for example, the inner edge could be circular and the outer edge square.

The total planar area (i.e. the combined planar (x/y) area of the inner region and border region) of the reinforced membrane-seal assembly will be dependent on the final use of the reinforced membrane-seal assembly; selection of a suitably overall planar area will be within the capability of the skilled person.

The dimensions of the inner and border regions in each layer will be determined by the total planar area and will also be dependent on the final use of the reinforced membrane-seal assembly; selection of suitable dimensions will be within the capability of the skilled person.

Ion-Conducting Component

Depending on the method of manufacture of the reinforced membrane-seal assembly of the invention, one or more different ion-conducting components may be present in the reinforced membrane-seal assembly.

The ion-conducting component(s) are either selected from the group of proton-conducting polymers or are selected from the group of anion-conducting polymers, such as a hydroxyl anion-conducting polymer. Examples of suitable proton-conducting polymers include perfluorosulphonic acid ionomers (e.g. Nafion® (E.I. DuPont de Nemours and Co.), Aciplex® (Asahi Kasei), Aquivion™ (Solvay Specialty Polymers), Flemion® (Asahi Glass Co.), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH.

The ion-conducting components may independently comprise one or more components which assist the chemical durability of the membrane, for example a hydrogen peroxide decomposition catalyst, a radical scavenger etc. Examples of such components are know to those skilled in the art.

Seal Component

Depending on the method of manufacture of the reinforced membrane-seal assembly, more than one type of seal component may be present.

The seal component is required to be compatible with the ion conducting component and the planar reinforcing component. The seal component should be non-ion conducting and within the final product must possess the necessary mechanical, thermal and chemical characteristics for operation in a fuel cell stack. The seal component must be able to withstand any deformation when the carrier material is removed on completion of the processing.

Examples of suitable materials which may be used for the seal component, include fluorosilicones, polyurethanes, co-polyamides, epoxies and fluoroacrylates. Specific examples of suitable sealing components include: polyvinylidenefluoride (PVDF), polyetherimide (PEI), polyimide (PI), polyethersulphone (PES), fluorinated ethylene propylene (FEP), polyethylene naphthalate (PEN), ethylene tetrafluoroethylene (ETFE), Viton®, polyethylene oxide (PEO), polyphenylene ether (PPE), polyethylene terephthalate (PET), polyacrylonitrile (PAN), poly(p-phenylene sulphide) (PPS), polyolefins and silicones.

Planar Reinforcing Component

The first, second and any additional planar reinforcing components are present to provide strength and reinforcement to the reinforced membrane-seal assembly.

The first, second and any additional planar reinforcing components are formed from a porous material. The first, second and any additional planar reinforcing components may be formed from the same or different porous materials. The porous material should possess at least some of the following properties: be compatible with the ion-conducting and seal components such that these components can readily impregnate into the porous material whilst maintaining a porous structure; provide improved mechanical strength and dimensional stability under variable humidity of the final MEA; be non-conductive; and be chemically and thermally stable at the temperatures at which the fuel cell will be operated.

Suitable planar reinforcing components include, but are not limited to, those formed from nanofibre structures (for example formed by electrospinning or force spinning), those formed from expanded polymer networks and those formed by engineering of a planar non-porous structure. Examples of materials suitable for use are typically polymeric and include polytetrafluoroethylene (PTFE), polyvinylidene difluoride (PVDF), polyetherether ketone (PEEK), polyimide (PI), polyetherimide, polyethersulphone (PES) and polypropylene (PP).

The porosity of the porous material making up the first, second and any additional planar reinforcing components is suitably greater than 30%, preferably greater than 50% and most preferably greater than 70%. Suitably, the porosity is less than 95%. The porosity (n) is calculated according to the formula $n=V_v/V_t \times 100$, wherein n is the porosity, $V_v$ is the voids volume and $V_t$ is the total volume of the porous material. The voids volume and the total volume of the porous material can be determined by the methods known to those skilled in the art.

The porous material making up the first, second and any additional planar reinforcing components may be isotropic or anisotropic. If anisotropic, the direction of isotropy in adjacent planar reinforcing components may be the same or may be at an angle, such as at 90°, to each other to provide additional stability to the reinforced membrane-seal assembly in all directions.

The first, second and any additional planar reinforcing components can extend to the outer edge of the border region in all directions; i.e. the planar reinforcing component is co-extensive with the outer edge of the border region.

Alternatively, the first, second and any additional planar reinforcing components may be larger in planar area than the planar area of the inner region, but smaller in area than the total planar area of the reinforced membrane-seal assembly.

Alternatively, at least one of the first, second and any additional planar reinforcing component extends to the outer edge of the border region and at least one other of the first, second and any additional planar reinforcing component is larger in planar area than the planar area of the inner region, but smaller in area than the total planar area of the reinforced membrane-seal assembly.

Alternatively, one or more of the first, second any additional planar reinforcing components is co-extensive with the outer edge of the border region in one planar direction (e.g. x-direction), but stops at a point between an inner edge and outer edge of the border region in the second planar direction (e.g. y-direction).

Whilst the invention is described as having ion-conducting component present in the inner region and the seal component present in the border region, there may be a blended region of up to 5 mm in the planar (x and/or y) direction at the interface of the ion-conducting component(s) and seal component(s); this blended region will therefore comprise both ion-conducting component and seal component.

In the blended region, if the seal component and ion-conducting component are miscible, there may be complete mixing of the two components, such that distribution of the components throughout the blended region is uniform.

Alternatively, if the seal component and ion-conducting component are not miscible, in the blended region there may be one or more 'islands' of seal components surround by ion-conducting component.

Alternatively, in the blended region there may be one or more 'islands' of ion-conducting component surrounded by seal component.

Alternatively, the blended region may comprise a mixture of two or more of the arrangements described above.

Alternatively, the interface of the ion-conducting component and seal component may be not perfectly linear, but may be irregular, for example providing a 'wavy' line.

Alternatively, there may be a mixture of an irregular interface and a blended region.

Although described with reference to the x and/or y directions, the blended region and irregular interface could also apply to the through plane (x) direction.

Alternatively, one component may overlap another component by up to 5 mm in the planar direction at the interface of the two components.

In one embodiment, the ion-conducting component and/or seal component does not extend beyond the planar reinforcing component in a through-plane (z) direction, such that there is no ion-conducting component and/or seal component which is not impregnated into one or other of the first and/or second planar reinforcing components.

Alternatively, the ion-conducting component and/or seal component extends beyond the planar reinforcing component in a thickness direction such that there is a layer of ion-conducting component and/or seal component which is not impregnated into either the first or second planar reinforcing component. This unreinforced layer of ion-conducting component and/or seal component may applied in an additional step or the unreinforced layer of ion-conducting component and/or seal component may be created by shrinkage of the planar reinforcing component on drying. If this unreinforced layer is applied as an additional step, the interface between the unreinforced layer of sealing component and the unreinforced layer of ion-conducting component can be off-set from the interface between the sealing component and the ion-conducting component in the layer containing the planar reinforcing component and/or from the interface in any unreinforced layer on the other face of the planar reinforcing component.

Any unreinforced layer of seal component may overlap the ion-conducting component (ion-conducting component either impregnated into the pores of the planar reinforcing component or ion-conducting component extending beyond the planar reinforcing component in a through-plane direction (z-direction). Any overlap may be greater than or equal to 1 mm. The overlap may be less than or equal to 10 mm. Alternatively, instead of being an overlap there may be a blended region as herein before described comprising both ion-conducting component and seal component.

The thickness of the reinforced membrane-seal assembly in the through-plane direction (z-direction) in the inner region will depend upon its final application. In general however, the thickness will be ≤50 μm, such as ≤35 μm, for example ≤25 μm. Suitably, the thickness is ≥5 μm. In one embodiment, the reinforced membrane-seal assembly has a thickness in the through-plane (z-direction) in the inner region of from 8-25 μm.

The invention will now be described in more detail with reference to the drawings which are illustrative and not limiting of the invention.

Figure 2:
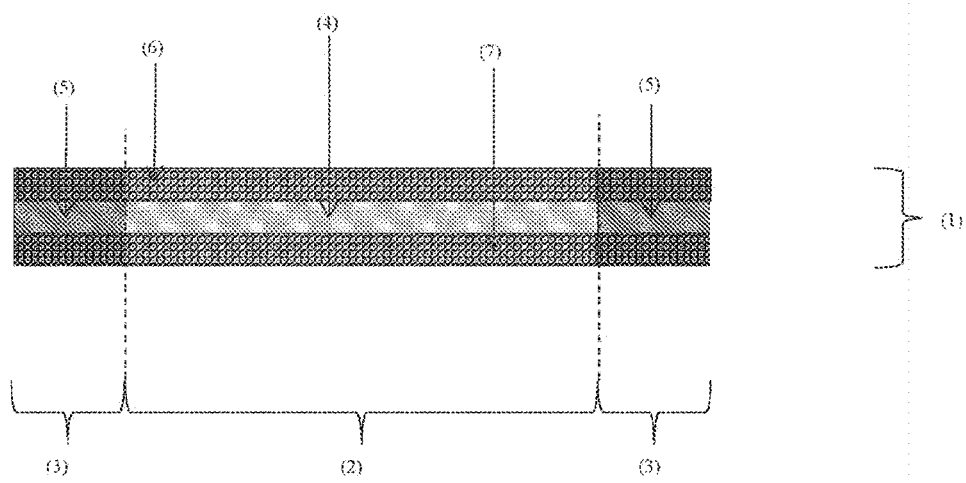
FIGS. 2 to 4 show cross-sectional views of reinforced membrane-seal assemblies according to the invention.

FIG. 2 shows a cross-sectional view of a reinforced membrane-seal assembly (1) of the invention an inner region (2) and a border region (3). The inner region of each layer comprises ion-conducting component (4) and the border region of each component comprises seal component (5). A first planar reinforcing component (6) and a second planar reinforcing component (7) (shown by the cross-hatching) extend across the inner region (2) and into the border region (3) of the reinforced membrane-seal assembly (1). The first and second reinforcing components (6 and 7) are embedded within ion-conducting component (4) and seal component (5), such that all the pores of the first and second reinforcing components (6 and 7) are essentially filled with ion-conducting component (4) or seal component (5). By the phrase 'essentially filled' is meant that at least 90%, suitably at least 95% and preferably at least 99% of the pore volume of the reinforcing component is filled.

Although FIG. 2 shows the two planar reinforcing components being separated by an unreinforced band of ion-conducting component and seal component, the skilled person will appreciated that during fabrication and/or further processing of the reinforced membrane-seal assembly, this separation may be reduced and may be reduced to such an extent that the two planar reinforcing components are essentially adjacent and in contact with each other.

Figure 3:
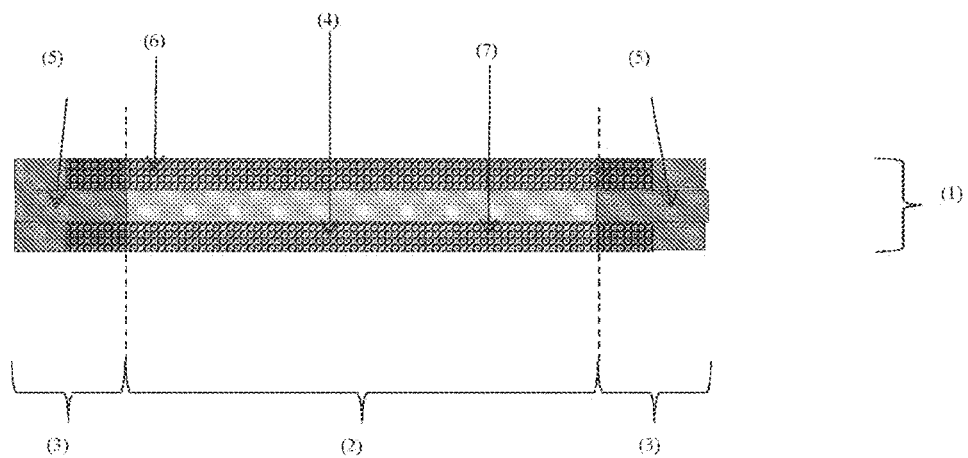

FIG. 3 shows a cross-sectional view of a reinforced membrane-seal assembly (1) of the invention similar to that shown in FIG. 2; all numbering of components remains the same. However, in FIG. 3, it can be seen that the first and second reinforcing components (6 and 7) do not extend to the edge of the border region, but stop at a location between the inner edge and the outer edge of the border region. The first and second reinforcing components (6 and 7) may stop at a location between the inner and outer edge of the border region in both planar directions or in only one planar direction, such as the cross-web direction in the case of a continuously manufactured reinforced membrane-seal assembly.

Figure 4:
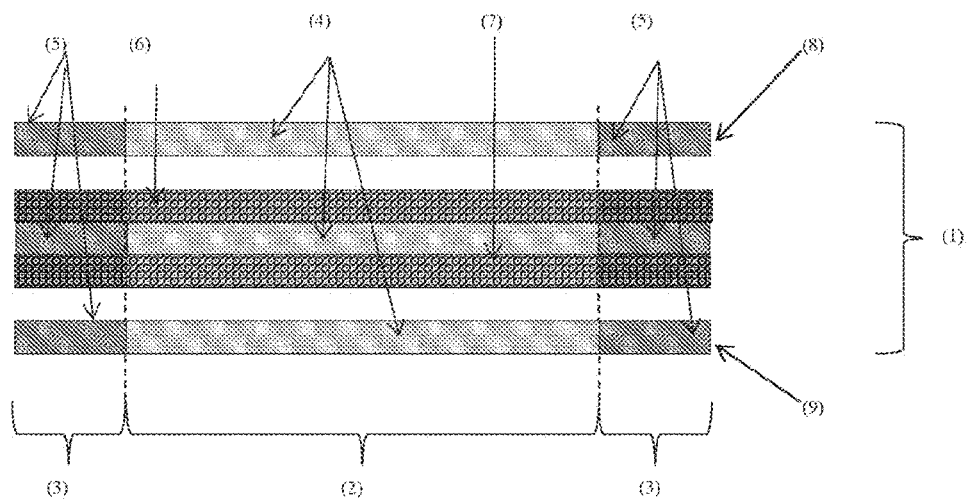

FIG. 4 shows an expanded cross-sectional view of a reinforced membrane-seal assembly (1) of the invention similar to FIG. 1 but wherein ion-conducting component (4) and seal component (5) extend beyond the first and second planar reinforcing components (6 and 7) in a through plane (z) direction providing unreinforced layers (8 and 9). The skilled person will appreciated that the interface between the seal component and ion-conducting component in one or both of the unreinforced layer(s) (8 and 9) may be off-set from each other and/or off-set from one or both of the interfaces of seal component and ion-conducting component embedded in the planar reinforcing components.

Although the figures show inner and border regions having the same dimensions throughout the reinforced membrane-seal assembly, the skilled person will appreciate that the dimensions of the inner and border may vary throughout the reinforced membrane-seal assembly in the through-plane direction depending on the final design requirements and the method of manufacture.

The reinforced membrane-seal assembly of the invention may be manufactured by a number of different methods. In one method, the reinforced membrane-seal assembly is built up as layers, for example on a carrier material, by depositing the ion-conducting component onto the carrier material (to form the inner region) and the seal component around the ion-conducting component (to form the border region). Alternatively, the seal component can be deposited first, followed by the ion-conducting component. The layer is then dried. If the layer comprises a planar reinforcing component, this is applied to the wet seal component/ion-conducting component before drying to allow the planar reinforcing component to become embedded within the ion-conducting component/seal component such that all the pores of the planar reinforcing component are essentially filled with either ion-conducting component or seal component. Additional layers are then added as required. The carrier material is then removed from the reinforced membrane-seal assembly at an appropriate time.

The ion-conducting component and seal component are dried individually after deposition of each or may be dried in a single step once both are deposited. Drying, essentially to remove the solvent(s) from the ion-conducting or seal component coating dispersions, may be effected by any suitable heating technique known to those in the art, for examples air impingement, infra-red etc. Suitably, the drying is typically carried out at a temperature of 70-120° C. but will depend on the nature of the solvent and could be up to or over 200° C.

The seal component, and depending on the ion-conducting component, may also be cured, in addition to being dried, to provide mechanical and chemical strength of the component. Curing is a chemical reaction to effect a change, such as crosslinking, and could be thermally activated (e.g. by heat or IR) or activated by UV.

In addition, the ion-conducting component may be annealed, in addition to being dried (and optionally cured), to alter and strengthen the crystalline structure of the ionomer. Any annealing step would employ elevated temperatures compared to the drying step, for example up to 200° C.

The curing and/or annealing steps may be carried out after each drying step or at the end of the deposition process before removal of the carrier material. Depending on the materials used for the seal component and ion-conducting component, the curing and annealing may be effected in a single process.

The carrier material is not part of the final reinforced membrane-seal assembly, but is intended to be removed in a subsequent step; this step may be immediately after the reinforced membrane-seal assembly is formed or may be at some point downstream in the production process after the reinforced membrane-seal assembly is combined with other components to form a catalyst-coated reinforced membrane-seal assembly or a reinforced membrane-seal electrode assembly. The carrier provides support for the reinforced membrane-seal assembly during manufacture and if not immediately removed, can provide support and strength during any subsequent storage and/or transport. The material from which the carrier is made should provide the required support, is compatible with the planar reinforcing component, ion-conducting component and seal component, is impermeable to the ion-conducting component and seal component, is able to withstand the process conditions involved in producing the reinforced membrane-seal assembly and is able to be easily removed without damage to the reinforced membrane-seal assembly. Examples of materials suitable for use include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene), and polyolefins, such as biaxially oriented polypropylene (BOPP). Other examples include laminates, multi-layer extrusions and coated films/foils capable of retaining their mechanical strength/integrity at elevated temperatures, for example temperatures up to 200° C. Examples include laminates of: poly(ethylene-co-tetrafluoroethylene) (ETFE) and polyethylene naphthalate (PEN); polymethylpentene (PMP) and PEN; polyperfluoroalkoxy (PFA) and polyethylene terephthalate (PET) and polyimide (PI). The laminates can have two or more layers, for example ETFE-PEN-ETFE, PMP-PEN-PMP, PFA-PET-PFA, PEN-PFA, FEP-PI-FEP, PFA-PI-PFA and PTFE-PI-PTFE. The layers may be bonded using an adhesive, such as acrylic or polyurethane.

The reinforced membrane-seal assembly of the invention may be used in any electrochemical device requiring an ion-conducting membrane. Accordingly, a further aspect of the invention provides an electrochemical device comprising a reinforced membrane-seal assembly as hereinbefore described. Alternatively, there is provided the use of a reinforced membrane-seal assembly as hereinbefore described in an electrochemical device. An example of an electrochemical device in which the reinforced membrane-seal assembly of the invention is particularly useful is a fuel cell, for example a PEMFC.

The invention further provides a catalyst-coated reinforced membrane-seal assembly comprising a reinforced membrane-seal assembly as hereinbefore described and a catalyst layer present on at least one face of the reinforced membrane-seal assembly. A catalyst layer may be present on both faces of the reinforced membrane-seal assembly.

The catalyst layer comprises one or more electrocatalysts, which may be a finely divided unsupported metal powder, or may be a supported catalyst wherein small metal nanoparticles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
  or an alloy or mixture comprising one or more of these metals or their oxides.
The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt % of the weight of resulting electrocatalyst.

The catalyst layer is suitably applied to a face of the reinforced membrane-seal assembly as an ink, either organic or aqueous (but preferably aqueous). The ink may suitably comprise other components, such as ion-conducting polymer as described in EP0731520, which are included to improve the ionic conductivity within the layer. Alternatively, the catalyst is applied to a face of the reinforced membrane-seal assembly by decal transfer of a previously prepared catalyst layer.

The catalyst layer may further comprise additional components. Such additional component include, but are not limited to, a catalyst which facilitates oxygen evolution and therefore will be of benefit in cell reversal and start-up/shut-down situations, or a hydrogen peroxide decomposition catalyst. Examples of such catalysts and any other additives suitable for inclusion in the catalyst layer will be known to those skilled in the art.

The invention further provides a reinforced membrane-seal electrode assembly comprising a reinforced membrane-seal assembly as hereinbefore described and a gas diffusion electrode present on at least one face of the reinforced membrane-seal assembly. A gas diffusion electrode may be present on both faces of the reinforced membrane-seal assembly.

The reinforced membrane-seal electrode assembly may be made up in a number of ways including, but not limited to:
  (i) a reinforced membrane-seal assembly of the invention may be postioned between two gas diffusion electrodes (one anode and one cathode);
  (ii) a catalyst-coated reinforced membrane-seal assembly of the invention coated on one side only by an catalyst layer may be postioned between a gas diffusion layer and a gas diffusion electrode, the gas diffusion layer contacting the side of the catalyst-coated reinforced membrane-seal assembly coated with the catalyst layer or;
  (iii) a catalyst-coated reinforced membrane-seal assembly of the invention coated on both sides with a catalyst layer may be postioned between two gas diffusion layers.

To assist bonding of the components and formation of an integrated membrane-seal assembly, an adhesive layer may be applied on at least a part of the exposed border region(s) of the reinforced membrane-seal assembly.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SCL Technologies GmbH, Germany or AvCarb® series from Ballard Power Systems Inc., or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

The reinforced membrane-seal assembly, catalyst-coated reinforced membrane-seal assembly or reinforced membrane-seal electrode assembly may further comprise an additive. The additive may be present internally within any of the individual component layers of the reinforced membrane-seal assembly, catalyst-coated reinforced membrane-seal assembly or reinforced membrane-seal electrode assembly or in the case of the catalyst-coated reinforced membrane-seal assembly or reinforced membrane-seal electrode assembly, may be present at one or more of the interfaces between the various layers and/or within one or more of the layers.

The additive may be one or more selected from the group consisting of hydrogen peroxide decomposition catalysts, radical scavengers, free radical decomposition catalyst, self-regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (ceria).

A further aspect of the invention provides a sub-gasketted catalyst-coated reinforced membrane-seal assembly comprising a catalyst-coated reinforced membrane-seal assembly of the invention and a sub-gasket applied to the seal component on one or both faces of the catalyst-coated reinforced membrane-seal assembly. The sub-gasket is designed to provide additional strength and robustness to the edges of the catalyst-coated membrane-seal assembly. The sub-gasket is typically a polymeric material and may be selected from the same materials as the seal component materials or may be a different type of polymer specifically selected for its application as a sub-gasket. The sub-gasket may be coated onto the seal components of the catalyst-coated membrane-seal assembly using similar processes to those described for application of the seal components, or may be applied as a pre-formed picture frame film over the seal components. The sub-gasket may be applied to one or both faces of the catalyst-coated membrane-seal assembly, but when applied to both faces it can only be accomplished following removal of the carrier material.

An adhesive layer may be used to assist adhesion of the sub-gasket to the catalyst-coated reinforced membrane-seal assembly. The adhesive layer may be an integral part of the sub-gasket, such that the sub-gasket and adhesive layer are applied in a single step, or the adhesive layer may first be applied to the catalyst-coated reinforced membrane-seal assembly and the sub-gasket subsequently applied to the adhesive layer.

A further aspect of the invention provides a sub-gasketed reinforced membrane-seal electrode assembly comprising a catalyst-coated reinforced membrane-seal assembly, a gas diffusion layer on one or both faces of the catalyst-coated reinforced membrane-seal assembly and a sub-gasket applied to one or both faces of the catalyst-coated reinforced membrane-seal assembly.

The invention further provides a fuel cell comprising a reinforced membrane-seal assembly, a catalyst-coated reinforced membrane-seal assembly or a reinforced membrane-seal electrode assembly as hereinbefore described. In one embodiment, the fuel cell is a PEMFC.

The embodiments of the invention so far been described with respect to single or individual reinforced membrane-seal assemblies, catalyst-coated reinforced membrane-seal assemblies or reinforced membrane-seal electrode assemblies. However, the teaching of the invention can also be applied to a continuous roll of multiple reinforced membrane-seal assemblies, catalyst-coated reinforced membrane-seal assemblies and reinforced membrane-seal electrode assemblies. Such products may be made using a similar process to that described in co-pending UK Patent Application.

All of the embodiments described hereinabove apply equally to use in proton exchange membrane (PEM) based electrolysers. In these PEM electrolysers, a voltage is applied across the membrane electrode assemblies such that water supplied to the device is split into hydrogen and oxygen, at the cathode and anode respectively. The MEAs may require different catalyst components to a PEM fuel cell, such as Ir and Ru based materials at the anode, but are otherwise very similar in construction to MEAs for fuel cells.

The invention claimed is:

1. A reinforced membrane-seal assembly, the reinforced membrane seal assembly comprising an inner region and a border region and wherein the inner region comprises ion-conducting component and the border region comprises seal component, the seal component being non-ion-conducting;
wherein first and second planar reinforcing components each extend across the inner region into the border region and wherein pores of each of the first and second planar reinforcing components in the inner region are impregnated with ion-conducting component and the pores of each of the first and second planar reinforcing components in the border region are impregnated with seal component.

2. A reinforced membrane-seal assembly according to claim 1, wherein one or more additional planar porous reinforcing components extend across the inner region into the border region of the reinforced membrane-seal assembly.

3. A reinforced membrane-seal assembly according to claim 2, wherein the ion-conducting component and/or seal component does not extend beyond the first or second planar reinforcing component in a through-plane direction.

4. A reinforced membrane-seal assembly according to claim 2, wherein the ion-conducting component and/or seal component extends beyond the first or second planar reinforcing such that there is a layer of ion-conducting component and/or seal component which is not impregnated into either the first or second planar reinforcing component.

5. A reinforced membrane-seal assembly according to claim 1, wherein the ion-conducting component and/or seal component does not extend beyond the first or second planar reinforcing component in a through-plane direction.

6. A reinforced membrane-seal assembly according to claim 1, wherein the ion-conducting component and/or seal component extends beyond the first or second planar reinforcing such that there is a layer of ion-conducting component and/or seal component which is not impregnated into either the first or second planar reinforcing component.

7. A reinforced membrane-seal electrode assembly comprising a reinforced membrane-seal assembly according to claim 1, and an electrode present on at least one face of the membrane-seal assembly.

8. A reinforced membrane-seal electrode assembly according to claim 7, wherein a catalyst layer is present on both faces of the reinforced membrane-seal assembly.

9. A catalyst-coated reinforced membrane-seal assembly comprising a membrane-seal assembly according to claim 1, and a catalyst layer present on at least one face of the membrane-seal assembly.

10. A catalyst-coated reinforced membrane-seal assembly according to claim 9, wherein a catalyst layer is present on both faces of the membrane-seal assembly.

11. An electrochemical device comprising a reinforced membrane-seal assembly according to claim 1.

12. An electrochemical device according to claim 11, wherein the electrochemical device is a fuel cell.

* * * * *